June 24, 1969  O. T. QUIMBY  3,451,937
PHOSPHONATE COMPOUNDS
Original Filed Sept. 23, 1965
Fig. I
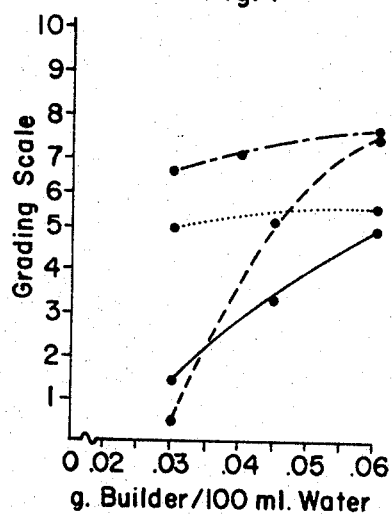
Fig. II
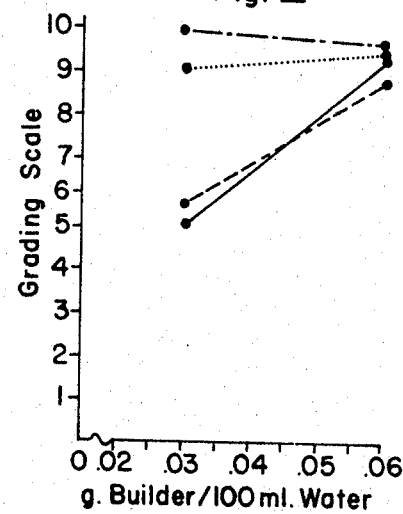
Fig. III
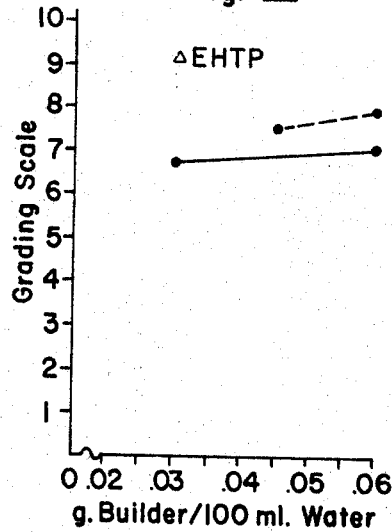
Fig. IV
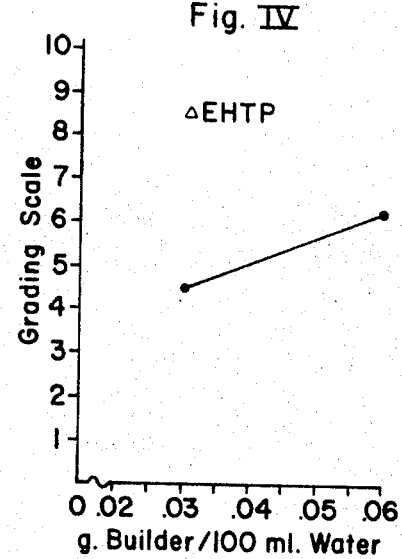
Fig. 5
Measurement of Cleaning Performance
——— STP
—·—·— $Na_5E$-1-HTP
·········· $Na_5E$-2-HTP
— — — $Na_4$EDTA
Oscar T. Quimby
INVENTOR.
BY
ATTORNEYS

United States Patent Office 3,451,937
Patented June 24, 1969

3,451,937
PHOSPHONATE COMPOUNDS
Oscar T. Quimby, Cincinnati, Ohio, assignor to The Procter & Gamble Company, Cincinnati, Ohio, a corporation of Ohio
Original application Sept. 23, 1965, Ser. No. 489,637, now Patent No. 3,400,148, dated Sept. 3, 1968. Divided and this application May 16, 1968, Ser. No. 739,962
Int. Cl. C11d 1/60
U.S. Cl. 252—152   4 Claims This is a division of application Ser. No. 489,637 filed Sept. 23, 1965 which issued as U.S. Patent 3,400,148 on Sept. 3, 1968.

This invention relates to a new class of organophosphorus compounds. It also relates to processes for preparing such compounds, as well as water treatment processes employing said compounds. The present invention also relates to laundry and detergent compositions containing the organophosphorus compounds described below.

The new compounds are ethanehydroxy-1,1,2-triphosphonic acids and derivatives thereof having the following general formula

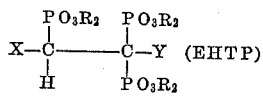

$$X-\underset{H}{\underset{|}{C}}(\mathrm{PO_3R_2})-\underset{PO_3R_2}{\underset{|}{C}}(\mathrm{PO_3R_2})-Y \quad \text{(EHTP)}$$

in which X and Y are selected from the group consisting of hydrogen and hydroxyl such that when X is hydrogen, Y is hydroxyl and when X is hydroxyl, Y is hydrogen and in which R is selected from the group consisting of hydrogen, alkali metal, and lower alkyl radicals having from 1 to about 6 carbon atoms.

Thus, there is contemplated within the terms of the present invention triphosphonate compounds having the formula

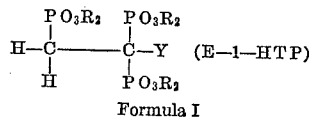

$$H-\underset{H}{\underset{|}{C}}(\mathrm{PO_3R_2})-\underset{PO_3R_2}{\underset{|}{C}}(\mathrm{PO_3R_2})-Y \quad \text{(E-1-HTP)}$$

Formula I as well as compounds having the formula

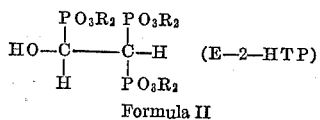

$$HO-\underset{H}{\underset{|}{C}}(\mathrm{PO_3R_2})-\underset{PO_3R_2}{\underset{|}{C}}(\mathrm{PO_3R_2})-H \quad \text{(E-2-HTP)}$$

Formula II wherein R has the meaning ascribed above.

In the accompanying drawings, FIGURES I–IV are graphs depicting the embodiments of the present invention in which the foregoing compounds are employed usefully as builders in detergent compositions. They are referred to in detail hereinafter.

The compounds depicted by Formula I, above, are named ethane-1-hydroxy-1,1,2-triphosphonates. The acid represented by this formula is ethane-1-hydroxy-1,1,2-triphosphonic acid. Specific examples of compounds falling within the contemplation of Formula I are trisodium trihydrogen ethane-1-hydroxy-1,1,2-triphosphonate; tetrasodium dihydrogen ethane-1-hydroxy-1,1,2-triphosphonates; pentasodium monohydrogen ethane-1-hydroxy-1,1,2-triphosphonates; and hexasodium ethane-1-hydroxy-1,1,2-triphosphonate. The corresponding alkali metal salts such as potassium and lithium can be prepared and also fall within the scope of the present invention.

Yet other specific examples of compounds of the present invention are: hexamethyl ester of ethane-1-hydroxy-1,1,2-triphosphonate acid; hexa-iso-propyl ester of ethane-1-hydroxy-1,1,2-triphosphonate acid; hexa-allyl ester of ethane-1-hydroxy-1,1,2-triphosphonate acid; hexa-cyclohexyl ester of ethane-1-hydroxy-1,1,2-triphosphonate acid; hexa-n-butyl ester of ethane-1-hydroxy-1,1,2-triphosphonate acid; and hexa-t-butyl ester of ethane-1-hydroxy-1,1,2-triphosphonate acid.

The compounds depicted by Formula II, above, are named ethane-2-hydroxy-1,1,2-triphosphonates. The acid represented by this formula is ethane-2-hydroxy-1,1,2-triphosphonic acid. Specific examples of compounds falling within the contemplation of Formula II are trisodium trihydrogen ethane-2-hydroxy-1,1,2-triphosphonate; tetrasodium dihydrogen ethane-2-hydroxy-1,1,2-triphosphonate; pentasodium monohydrogen ethane-2-hydroxy-1,1,2-triphosphonate; hexasodium ethane-2-hydroxy-1,1,2-triphosphonate.

The corresponding alkali metal salts such as potassium and lithium can also be prepared and also fall within the scope of this invention.

Yet other specific examples of compounds of the present invention are: hexamethyl ester of ethane-2-hydroxy-1,1,2-triphosphonate acid; hexa-iso-propyl ester of ethane-2-hydroxy-1,1,2-triphosphonate acid; hexa-allyl ester of ethane-2-hydroxy-1,1,2-triphosphonate acid; hexacyclohexyl ester of ethane-2-hydroxy-1,1,2-triphosphonate acid; hexa-n-butyl ester of ethane-1-hydroxy-1,1,2-triphosphonate acid; and hexa-t-butyl ester of ethane-2-hydroxy-1,1,2-triphosphonate acid.

The ethanehydroxy-1,1,2-triphosphonic acid compounds (using the acid forms as being representative of all of the compounds of the present invention) have many useful applications. The compounds have valuable chelating and sequestering properties and, therefore, are useful in the manifold applications of sequestrants both in industrial and household situations. It is a special purpose of the present invention, for example, to provide a novel process for sequestering hardness-imparting ions in water supplies such as calcium, magnesium, iron and the like and thereby soften water and otherwise make it free of the hardness-imparting ingredients. It is well known that there are many industrial areas where metal contaminants, even in trace amounts, present serious problems. A comprehensive discussion of properties and applications of sequestering agents can be found in a text written by Stanley Chabarek and Arthur E. Martell, entitled Organic Sequestering Agents (Wiley & Sons, 1959). An especially useful and valuable embodiment of the present invention comprises outstanding detergent and laundering compositions in which the novel compounds of the present invention are present as detergency builders.

PREPARATION OF ETHANE-1-HYDROXY-1,1,2-TRIPHOSPHONIC ACID (E—1—HTP)

The compounds depicted in Formula I, that is, the ethane-1-hydroxy-1,1,2-triphosphonates, are prepared by reacting a compound having a formula

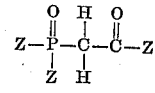

$$Z-\underset{\underset{Z}{|}}{\overset{\overset{O}{\|}}{P}}-\underset{\underset{H}{|}}{\overset{\overset{H}{|}}{C}}-\overset{\overset{O}{\|}}{C}-Z$$

Formula III wherein Z represents a hydroxyl group, chlorine or bromine with at least one inorganic phosphorus containing compound which is phosphorous acid $H_3PO_3$, and/or a phosphorous acid precursor.

Compounds represented by Formula III include phosphonoacetic acid, phosphonoacetyl chloride, dichlorophosphonoacetyl chloride, phosphonoacetyl bromide, dibromophosphonoacetyl bromide.

The phosphorous acid precursors which can be used in the present invention alone or in admixture with the $H_3PO_3$ are defined as compounds which, upon reaction with hydroxyl groups from any source (e.g., on phosphorus as in phosphonate groups. —$PO_3H_2$, on carbon as in carboxyl groups, —COOH, or in limited amounts of water), form anhydride bonds such as phosphorus-oxygen-phosphorus, phosphorus-oxygen-carbon, or carbon-oxygen-carbon, and are sometimes accompanied by elimination of hydrochloric acid or a carboxylic acid.

Examples of phosphorous acid precursors useful herein include acid halides such as phosphorus halides, e.g., phosphorus mono-, di-, and trichlorides, and the corresponding bromides. Phosphorous acid anhydrides are also useful in the present invention as phosphorous acid precursors. Anhydrides of phosphorous acid are dehydration products of phosphorous acid, $H_3PO_3$. Ordinarily, dehydration products of phosphorous acid are characteristically represented by an expression showing the number of molecules of water which have been removed from a given amount of the acid.

For example, typical references to anhydrides are:

(a) $2H_3PO_3$—$1H_2O$ which defines a pyrophosphorous acid molecule, i.e.,

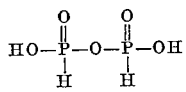

(b) trimetaphosphite, $3H_3PO_3$—$3H_2O$

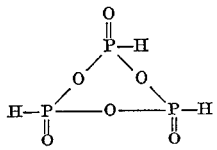

(c) $4H_3PO_3$—$4H_2O$ which can be thought of as representing a molecular arrangement, such as tetrametaphosphite:

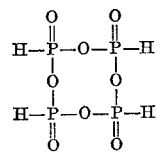

(d) $4H_3PO_3$—$6H_2O$, which represents the most condensed form of an anhydride of phosphorous acid, is called phosphorous anhydride, has the formula $P_4O_6$, a melting point of 24–25° C., and can be represented structurally as follows:

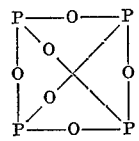

Two essential criteria have been discovered in connection with the reaction between the compound of Formula III and $H_3PO_3$ or a precursor thereof: (1) the foregoing reactants must be present in a proportion which provides an overall atomic carbon-to-phosphorus (C:P) ratio in the reactants of about 2:3; and (2) the reactants must be present in a proportion which provides an anhydrizing power (defined below) of from about 1 to about 4 for each mole of ethane-1-hydroxy-1,1,2-triphosphonic acid formed by the reaction.

A carbon-to-phosphorus atomic ratio of about 2:3 in the reaction system is essential. If this ratio is significantly exceeded, that is, if there is an excess of the starting carbon compound (Formula III) or of the phosphorous acid (or phosphorous acid precursor), the final product is contaminated by phosphonoacetic acid or phosphorous acid. Either impurity is undesirable, and the former is particularly difficult to remove.

For each reaction system, it is necessary to adjust the amount of each reactant to insure compliance with the C:P atomic ratio of about 2:3. This requirement is discussed in more detail below and is illustrated by examples.

According to the present invention, the anhydrizing power of the reaction system must be from about 1 to about 4, preferably from about 2.5 to 3.5 with the optimum being 3. For purposes of the present invention, the term "anhydrizing power" is defined as the total number of anhydride bonds, potential and actual, in the reactants per mole of ethane-1-hydroxy-1,1,2-triphosphonic acid formed by the reaction.

Potential anhydride bonds are those which occur, for example, in acid halides such as acid chlorides or acid bromides. They can be present as

or as

Each such moiety is able to form in the reaction system one anhydride bond like P—O—P, P—O—C, or C—O—C. Hence, an acid halide such as

or as

contributes one unit of anhydrizing power to the reaction mixture. If one of the reactants already contains an actual anhydride bond, e.g., the P—O—P linkage in

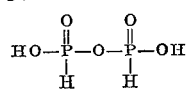

that reactant contributes one anhydride bond or unit to the reaction system. By virtue of these illustrations, it should be noted, by way of further example, that the anhydrizing power contributed to a reaction by a mole of $P_4O_6$ is 6, and by a mole of $PCl_3$ is 3.

Within the broadest terms of the present invention, the reaction system can comprise two reactants, or three reactants, or even more, provided that the foregoing reaction system requirements are complied with, i.e., C:P atomic ratio and anhydrizing power. The following reaction systems illustrate the flexibility of the novel process of the present invention:

(1) 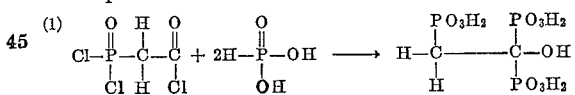

The reactants employed (left side of Equation 1) involve a total of 2 carbon and 3 phosphorus atoms, i.e., C:P=2:3, satisfying the first condition for making ethane-1-hydroxy-1,1,2-triphosphonic acid. The first reactant is an acid chloride containing 2 potential anhydride bonds (P—Cl) on the phosphorus atom and one potential anhydride bond (C—Cl) on the carbon atom; a mole of this reactant, therefore, contributes 3 units of anhydrizing power per mole of ethane-1-hydroxy-1,1,2-triphosphonate (EHTP) produced, satisfying the essential second condition for making ethane-1-hydroxy-1,1,2-triphosphonic acid.

(2) 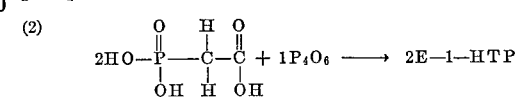

Two moles of phosphonoacetic acid contain 4 carbon atoms and 2 phosphorus atoms; when mixed with a mole of $P_4O_6$, the C:P atomic ratio of the reaction system is 4:6 or 2:3. The phosphonoacetic acid contributes no anhydrizing power to the system. This means that the required anhydrizing power must be contributed by the other reactant, i.e., the $P_4O_6$. In fact, 1 mole of $P_4O_6$ contributes 6 units (P—O—P) of anhydrizing power, 3 for each mole of ethane-1-hydroxy-1,1,2-triphosphonate produced. Thus, both conditions for maximum yield of ethane-1-hydroxy-1,1,2-triphosphonic acid have been met:

C:P=2:3 and anhydrizing power of 3 per each mole of ethane-1-hydroxy-1,1,2-triphosphonic acid produced.

(3)
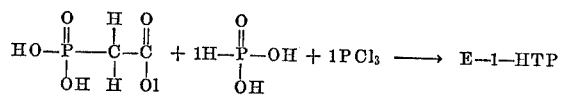 → E—1—HTP

Mixing these three reactants in 1:1:1 molar ratio satisfies both conditions: the C:P ratio is 2:3 and the mole of PCl₃ supplies 3 units of anhydrizing power per mole of ethane-1-hydroxy-1,1,2-triphosphonic acid produced.

(4)
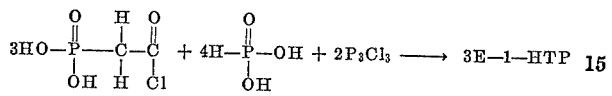 → 3E—1—HTP

Since two of these reactants contain anhydrizing power, they cannot be used in 1:1:1 molar ratio as in reaction system (3) above but must be used in 3:4:2 molar ratio so that C:P ratio is 2:3 and the anhydrizing power is three units per mole of ethane-1-hydroxy-1,1,2-triphosphonic acid produced.

(5)
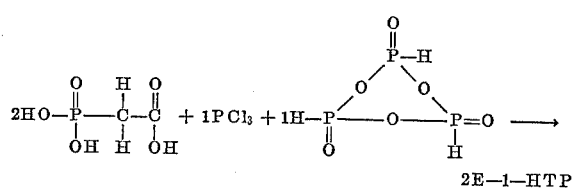
2E—1—HTP

Mixing these three reactants in the indicated 2:1:1 molar ratio supplies 4 carbon atoms for each 6 phosphorus atoms, i.e., C:P atomic ratio of 2:3. Each mole of PCl₃ and each mole of trimetaphosphite contributes 3 bonds of anhydrizing power; hence, the total anhydrizing power is 3 units per mole of ethane-1-hydroxy-1,1,2-triphosphonic acid produced.

(6)
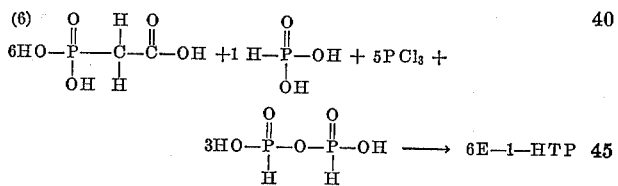 → 6E—1—HTP

Using the above 4 reactants in 6:1:5:3 molar ratio supplies a total of 12 carbon atoms for each 18 phosphorus atoms used, hence a C:P atomic ratio of 2:3. The 5 moles of PCl₃ supply 15 units (5×3 P—Cl bonds) of anhydrizing power; the 3 moles of pyrophosphorous acid supply 3 units of anhydrizing power, hence a total of 18 units of such power per 6 moles of ethane-1-hydroxy-1,1,2-triphosphonic acid produced, i.e., 3 such units for each mole of ethane-1-hydroxy-1,1,2-triphosphonic acid.

According to the present invention, it is necessary to perform the reaction in the presence of a polar, inert, organic solvent. Any such solvent can be used, but preferably the solvent should also be high boiling, that is, have a boiling point in excess of about 100° C. Materials such as tetrahydrofuran, di-n-propyl ether, and dioxane can be used satisfactorily, but due to their lower boiling points are less preferred. The practical consideration as respects the boiling point is that if the solvent would boil off during the reaction, steps would need to be taken to continuously replace the solvent driven off.

The reaction is a complicated one. It is known, for example, that the reaction goes through a complicated molecular rearrangement involving intermediate anhydride reaction products. The requirement for the solvent in the reaction to be polar is based, in part, on the need to dissolve the anhydride intermediates involved in the reaction. If these anhydride intermediates are not at least partially dissolved, a second liquid phase rich in the anhydride intermediate tends to form and separate out. This second liquid phase is so viscous that it can interfere with the stirring needed for rapid contact between the reactants and for rapid removal of heat so as to keep the temperature within the preferred range hereinafter described. When non-polar solvents are used, such as the hydrocarbons, or nearly non-polar chlorocarbons, such as pentachloroethane, the second liquid phase is practically unstirrable, just as if no solvent had been added. Chlorocarbons of slightly greater polarity, however, such as a-tetrachloroethane, ethers such as n-butyl or phenyl ether, or even the relatively polar nitrobenzene do provide a limited amount of thinning so that adequate stirring is possible, although difficult. Relatively more polar solvents, or polyethers such as bis-2-methoxyethyl ether, tetramethylene sulfone, di-n-propyl sulfone, and the like, dissolve more of the reactants, thin the mixture to a greater extent and hence allow more effective material and heat transfer; they also allow crystallization of —E—1—HTP or a condensate thereof to form an easily stirred slurry and induce greater completeness of reaction within a given time.

Besides being polar, the solvent must be inert to the reactants and the reaction intermediates. For example, dimethyl formamide, which might otherwise be suitable because it is a polar, high-boiling compound, cannot be used according to the present invention because it reacts with and consumes some reactants such as PCl₃, P₄O₆, and trimetaphosphite, forming unwanted products.

The materials which are preferred as solvents in the reaction system are such compounds as di-n-propyl sulfone, tetramethylene sulfone, dibutyl oxide, bis-2-methoxyethyl ether (diglyme), nitrobenzene, 1,1,2,2-tetrachloroethane and diphenyl oxide. Of these, n-propyl sulfone, tetramethylene sulfone, and 2,2′-dimethoxydiethyl ether are the most preferred. Other sulfones can be used also together with other low alkyl or aryl ether compounds.

The required polarity of the solvent excludes many organic solvents from the present application. In addition, the requirement of chemical inertness to reactants and anhydride intermediates is also essential and likewise excludes even more organic solvents. This latter independent requirement excludes many classes of compounds such as: (1) acids, anhydrides, or acid halides other than those specifically needed to make the desired product because they would react in analogous ways and complicate the mixture; (2) aldehydes and ketones because they undergo reactions which would be likely to convert the >C=O to >C(OH)PO₃H₂; (3) alcohols, primary and secondary amines because they are acylated by acid halides or anhydrides. Thus, all of these compounds (and many others) react in some way, consuming reactants and making unwanted impurities. Certain other polar organic compounds have been tried and found reactive, namely, acetonitrile, formamide, dimethylformamide, and dimethylsulfoxide. It is, therefore, not surprising that only a few classes of compounds have proved satisfactory; these include ethers, including polyethers such as diglyme, chlorocarbons having some polarity, aromatic nitro compounds and sulfones.

It has been discovered that the amount of solvent which is used is not in and of itself critical, provided that enough is used to allow adequate stirring. Thus, the reaction results in the formation of E—1—HTP even if small amounts of solvent are present. As a general rule, however, the solvent should be used at a level of from about ½ to about 5, and preferably from 1 to 3 times the weight of reactants.

The reaction mixture is heated to a temperature in the range of from about 50° C. to about 160° C. for a period of from about 1 hour to about 48 hours. Preferably, the reaction temperature is in the range of about 90° C. to about 140° C. and the duration being in the range of about 2 hours to about 22 hours.

If temperatures less than 50° C. are used, either very long times are required or the reaction is not completed. Temperatures above 160° C. should be avoided because they cause the formation of phosphate compounds which, for purposes of the present invention, are considered as impurities. Of course, if the ultimate use to which the ethane-1-hydroxy-1,1,2-triphosphonate compound is to be put can tolerate the presence of these reaction by-products, then the present invention can be practiced outside of the aforementioned temperature and time limits without departing from the scope and spirit of the present invention. Thus, for example, if it is desired to prepare a reaction mixture of a blend of phosphates and phosphites (some intermediate reaction products are believed to be phosphites) together with ethane-1-hydroxy-1,2,2-triphosphonic acid, then the reaction conditions can be suitably adjusted to provide such compositions.

While the specific reactants can be varied to prepare ethane-1-hydroxy-1,1,2-triphosphonic acid in the aforementioned manner, the reactions have in common the fact that in the preferred solvents the reaction is crystallization directed. In connection with this directive crystallization in di-n-propyl sulfone, for example, it has been discovered that crystallization does not occur as readily if the anhydrizing power of the reaction system is sigificantly less than about 3 units per mole of ethane-1-hydroxy-1,1,2-triphosphonic acid.

The crystalline material which forms during the reaction has been isolated and identified as a condensate of ethane-1-hydroxy-1,1,2-triphosphonic acid. At the present time, the precise chemical composition of the condensate is not known. However, it is known that the condensate is readily and completely hydrolyzable to the free acid which, in turn, can be converted to any desired salt form by addition of suitable base material, e.g., sodium or potassium hydroxide, and the like. The acid can also be easily converted to an ester by reaction of the anhydrous acid with either trialkyl or orthocarboxylic esters or diazomethane in a suitable solvent.

The final reaction product ethane-1-hydroxy-1,1,2-triphosphonic acid has been well characterized. Purification of ethane-1-hydroxy-1,1,2-triphosphonic acid for purposes of analysis was effected by several crystallizations from water-methanol, as the $Na_5H$ salt. Crystallization was continued until there was no detectable trace of any impurities. The free ethane-1-hydroxy-1,1,2-triphosphonic acid was obtained by ion exchanging the purified $Na_5H$ salt.

Characterization of a typical ethane-1-hydroxy-1,1,2-triphosphonate sample is as follows:

Molecular weight (on $Na_5H$ salt basis) 414 ($\pm 21$); theory 396

Wet chemical analysis: (of $Na_5H$ salt)

| | Found | Dry Basis | Theory for $C_2H_4Na_5O_{10}P_3$ |
|---|---|---|---|
| Wt. Loss (139° C., 15 microns) | 32.9 | | |
| $H_2O$ (Karl Fischer) | 34.0–32.6 | | |
| Na | 18.79 | 28.00 | 29.09 |
| P | 15.8 | 23.55 | 23.52 |
| C | 4.4 | 6.56 | 6.08 |
| H | 5.3 | 2.4 | 1.02 |

By acid-base titration (of $Na_5H$ salt), the equivalent weight (dry basis)=66.7–69.6; theory=66.0. Structural analysis, by $P^{31}$ and $H^1$ MR, is consistent with an $AB_2X_2$ system. For ethane-1-hydroxy-1,1,2-triphosphonate, A is the monophosphonate phosphorus, $B_2$ the diphosphonate phosphorus atoms, and $X_2$ the $CH_2$ protons.

Data for the free acid and $Na_3$ salt are as follows:

Free acid.—Delta for $A=-23.0$ p.p.m.,[1] Delta for $B_2=-17.9$ p.p.m.,[1] Delta for $X_2=7.3$ p.p.m.;[2] $J_{AB}=32$ cps.; $J_{AX}=19$ cps.; $J_{BX}=14$ cps.

$Na_3H_3$ salt.—Delta for $A=-21.1$ p.p.m.,[3] Delta for $B_2=-18.6$ p.p.m.,[3] Delta for $X_2=7.3$ p.p.m.;[4] $J_{AB}$ not determined; $J_{AX}=12$ cps.; $J_{BX}=14$ cps.

As the $Na_3$ salt, the two types of phosphorus nuclei are separated by only 2.5 p.p.m. For this reason, the decoupling work necessary for structural analysis was performed on the free acid (separation 5.1 p.p.m.).

Preparation of ethane-2-hydroxy-1,1,2-triphosphonic acid
(E—2—HTP)

The compounds depicted above in Formula II, that is, ethane-2-hydroxy-1,1,2-triphosphonates, are prepared by reacting tetraalkyl ethene-2-alkoxy-1,1-diphosphonate with hydrogen dialkylphosphite in the presence of a strong base catalyst such as sodium, potassium, lithium and hydrides of these metals. The reaction should be conducted at a temperature in the range of from about 20° C. to about 100° C. for a period of from about 1 to 3 hours. Preferably, the reaction temperature should be in the range of from about 30° C. to about 60° C. and should last from about 1.5 to about 2 hours. The reaction product so formed can then be converted to the acid by the usual procedures; for example, by boiling the reaction product with an excess of a hydrogen halide such as aqueous HCl or HBr.

The tetraalkyl ethene-2-alkoxy-1,1-diphosphonate reactant has the following formula:

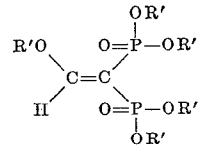

in which R' represents lower alkyl radicals having less than 7 carbon atoms and preferably less than 5 carbons. For instance, R' can be methyl, ethyl, propyl, i-propyl, butyl, i-butyl, pentyl, i-pentyl, hexyl, i-hexyl, or heptyl and the like. Examples of such compounds are:

tetraisopropylethene-2-methoxy-1,1-diphosphonate,
tetraisobutylethene-2-ethoxy-1,1-diphosphonate, and
tetrahexylethene-2-propoxy-1,1-diphosphonate.

As seen from the examples, the R' radicals need not be the same, a preferred compound being the tetraisopropylethene-2-methoxy-1,1-diphosphonate.

The starting material was prepared by reacting ethyl formate, sodium, and tetraisopropyl methylene disphosphonate in the presence of toluene solvent. The resulting $NaOCH=C(PO_3R'_2)_2$ was then alkylated by reaction with $CH_3Br$ to make NaBr + the desired methoxy compound $CH_3OCH=C(PO_3R'_2)_2$ and methyl bromide. An equation for the overall result is presented below, as it is presently understood, and a preparative example is also shown.

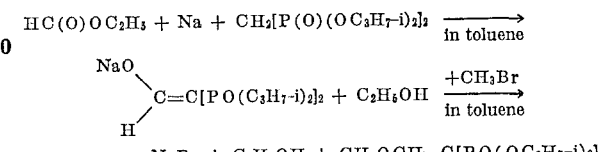

In the foregoing description, formate esters can be substituted for ethyl formate and other ester derivatives for the tetraisopropyl methylene diphosphonate. The prepa-

---

[1] Phosphorus chemical shifts relative to 85% $H_3PO_4$ (sealed in capillary) as 0.00 p.p.m.
[2] Proton chemical shift relative to tetramethylsilane (sealed in capillary) as 10.00 p.p.m.
[3] Phosphorus chemical shifts relative to 85% $H_3PO_4$ (sealed in capillary) as 0.00 p.p.m.
[4] Proton chemical shift relative to tetramethylsilane (sealed in capillary) as 10.00 p.p.m.

ration of this starting material forms no part of the present invention. It can be prepared in the foregoing manner or by any other suitable route.

Hydrogen dialkylphosphite, $HPO_3R'_2$, has the formula

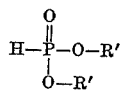

in which R' also represents a lower alkyl group having less than 7 carbon atoms, such as, for example, methyl, ethyl, propyl, i-propyl, butyl, i-butyl, pentyl, i-pentyl, hexyl, i-hexyl and the like.

The compounds preferred are those in which the R' alkyl groups contain less than 5 carbon atoms.

The step in which the desired methoxy ether of the desired 2-hydroxy triphosphonate is formed is:

$$CH_3OCHC(PO_3R'_2)_2 + HPO_3R'_2 \xrightarrow{Na} CH_3OCH(PO_3R'_2)CH(PO_3R'_2)_2$$

It is necessary to have a strong base catalyst present during the reaction. As mentioned above, suitable ones include alkali metals such as sodium, potassium, and lithium. The corresponding hydrides can also be used.

The strong base catalyst, e.g., the metals, are employed to provide a small amount of triply coordinated phosphorus compound. The quadruply coordinated compound (hydrogen dialkyl phosphite) converts to the triply coordinated compound thus:

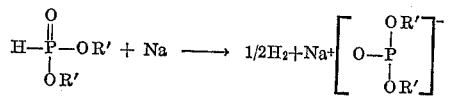

Probably as soon as the $[OP(OR')_2]^-$ adds to one of the carbons of the double bond in the overall reaction, a proton is caught from another $HPO_3R_2$ by the other carbon of the double bond, thus regenerating the ion $[OP(OR)_2]^-$.

As mentioned above, the reaction product from the reaction between the phosphite and the unsaturated ether comprises a saturated alkoxy triphosphonate ester. According to the present invention, the ester is hydrolyzed to make the corresponding free acid. In one embodiment, an excess of concentrated aqueous hydrochloric acid is added to the ester product and heated to a temperature in the range of from about 105° C. to 110° C. for a period of from about 2 hours to about 8 hours. It was surprisingly discovered that the lower alkyl radical of the alkoxy group was also removed together with the phosphonate ester groups during the hydrolysis step. As a result, the ester was converted to a free acid in a single step reaction.

The alkoxy alkyl group is stripped off and forms a corresponding alkyl halide which can readily be separated from the reaction product. Excess unreacted hydrochloric acid is also present in the system and can readily be separated and reused.

The hydrolysis step of the reaction for the preparation of ethane-2-hydroxy-1,1,2-triphosphonic acid is given below.

$$CH_3OCH(PO_3R'_2)CH(PO_3R'_2)_2 + 7HCl \longrightarrow$$

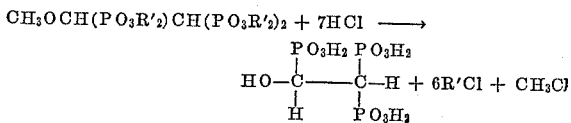

The ethanehydroxytriphosphonates of the present invention demonstrates excellent chemical stability under the conditions tested, which included strongly acid and strongly basic solutions as well as hypochlorite bleaches simulating washing conditions.

The following examples are illustrative of the processes of the present invention by which ethane-1-hydroxy-1,1,2-triphosphonate and ethane-2-hydroxy-1,1,2-triphosphonate compounds are prepared. They are by no means intended to be limiting on the foregoing description. Indeed, they are merely illustrative and it will be readily apparent that they, in turn, will suggest and make obvious other modifications, all of which are intended to come within the scope of the present invention.

In each of the following examples in which the reaction product was ethane-1-hydroxy-1,1,12-triphosphonic acid, the anhydrizing power of the reaction system was in the range of 1:4 and the carbon:phosphorus atomic ratio was about 2:3.

Example I

This example involves preparation of ethane-1-hydroxy-1,1,12-triphosphonic acid by way of anhydride intermediates which rearrange to form compounds with phosphorus-carbon bonds. The anhydrizing power of the reactants used was sufficient not only to convert the carboxyl group of phosphonoacetic acid to a hydroxydiphosphonate unit, but great enough to do the equivalent of abstracting two moles of water from each mole of ethane-1-hydroxy-1,1,2-triphosphonic acid. B-1-HTP, $$H_2O_3PCH_2C(OH)(PO_3H_2)_2,$$

resulting in the formation of a condensate which crystallizes from solution.

The reagents were combined in the following order:

(1) Di-n-propylsulfone, n-PrSO$_2$, 1000 g. (3 ml. solvent/gram of total reactants),
(2) Phosphonoacetic acid, $H_2O_3PCH_2CO_2H$, 147.4 g. (95% active)=1.0 mole,
(3) Phosphorous acid, $HPO_3H_2$, 83.3 g. (98.5% active)= 1.0 mole, and
(4) Phosphorus trichloride, $PCl_3$, 103 ml.=1.18 moles (0.18 mole to offset the water in (2) and (3)).

The mixture of the first three reagents was heated, while being stirred, to 85° C. to form a clear solution, and the PCl$_3$ was added slowly. After 11 minutes, when 50 ml. of PCl$_3$ had been added and the temperature had risen to 98° C., the mixture became two liquid layers, which were kept in intimate contact by vigorous stirring. During the next hour the remainder of the PCl$_3$ was added; the temperature rose to 116° C. and the lower liquid layer crystallized extensively. The mixture thickened as the second liquid formed, then thinned as the condensate which formed was crystallized. The slurry was digested for an additional 6 hours at 116° C., then cooled to room temperature.

The solid product was recovered by filtration, washed with ethyl ether, and dried under nitrogen. The yield was 307 g. (97%). Representing the condensate as $$[H_2O_3PCH_2C(OH)(PO_3H_2)2H_2O]$$

the reaction that had occurred can be written as follows:

$$H_2O_3PCH_2COOH+HPO_3H_2+PCl_3 \rightarrow [H_2O_3PCH_2$$
$$C(OH)(PO_3H_2)_2-2H_2O]+3HCl$$

By acid-base titration, the solid product had a purity of 79.4%, assuming the compound titrated to be $$[H_2O_3PCH_2C(OH)-(PO_3H_2)_2-2H_2O]$$

the remaining 20.6% was n-propyl sulfone, n-PrSO$_2$, that was either trapped or included in the solid as "solvent of crystallization." Analysis of an aqueous solution of the solid by $P^{31}$ mr. spectra revealed less than 5% of $HPO_3H_2$, the remaining phosphorus corresponding to ethane-1-hydroxy-1,1,2-triphosphonate and/or its condensate.

A portion of the above solid product was hydrolyzed to convert the condensate to ethane-1-hydroxy-1,1,2-triphosphonic acid, neutralized with sodium hydroxide and purified by crystallization. The sample thus purified was consistent with the Na$_5$H salt of ethane-1-hydroxy-1,1,2-triphosphonate by the following criteria:

(1) Nuclear magnetic resonance (both $P^{31}$ and $H^1$),
(2) Molecular weight by lowering of $Na_2SO_4 \cdot 10H_2O$ transition point, (3) Acid-base titration, and
(4) Elemental analysis, C:P ratio = 2:3.

The $Na_5H$ salt of ethane-1-hydroxy-1,1,2-triphosphonate was compared with sodium tripolyphosphate for ability to sequester calcium at 25° C. by the method of Irani and Callis, J. Phys. Chem. 64, 1398 (1960), except that caprate instead of oxalate was used as the indicator of the nephelometric end point. The efficiencies (in g. Ca/100 g. anhydrous Na salt) were as follows:

| pH | 8 | 9 | 10 | 11 |
|---|---|---|---|---|
| $Na_5H$ salt of E—1—HTP | 5.2 | 24.3 | 24.1 | 24.4 |
| $Na_5P_3O_{10}$ | | 7.5 | 8.1 | 7.9 |

Example II

Conditions were similar to those in Example I, except that less solvent ($n-PrSO_2$) and shorter times were used. The reagents were combined in the following order:

(1) Di-n-propyl sulfone, $n-PrSO_2$, 200 cc., 2½ ml. of solvent/g. of reactants,
(2) Phosphonoacetic acid, $H_2O_3PCH_2COOH$, 36.8 g. (95% active) = 0.25 mole,
(3) Phosphorous acid, $HPO_3H_2$, 20.8 g. (98.5% active) = 0.25 mole,
(4) Phosphorus trichloride, $PCl_3$, 25.7 ml. = 0.29 mole (0.04 mole to offset $H_2O$ in #2 and 3)

The first three reagents listed above were warmed, while stirring, to 95° C. to form a clear solution. The $PCl_3$ was added to the reaction mixture over a 40-minute period at 83 to 112° C. During the addition of $PCl_3$, the reaction mixture became two immiscible liquids and thickened appreciably, though adequate stirring was still possible. After an additional 15 minutes at 100° C., the reaction mixture started to crystallize. The temperature was maintained at 100 to 114° C. for an additional 2½ hours. The solids were removed by filtration, washed with ethyl ether, and dried, giving a yield of 88 g.

By acid-base titration, the product was found to be 66.2% active as the E—1—HTP-2 $H_2O$ condensate. The remaining 33.8% inactive was mostly $Pr_2SO_2$. This represents an overall yield of 93%.

By $P^{31}$ mr. spectra the product was wholly ethane-1-hydroxy-1,1,2-triphosphonic acid and/or its condensate. A portion of the condensate was hydrolyzed and found by $P^{31}$ mr. analysis to be $H_2O_3PCH_2C(OH)(PO_3H_2)_2$ containing about 5% $HPO_3H_2$ impurity.

Example III

The conditions here differ from those in Example I mainly in the nature of the solvent.

The reagents were combined in the following order:

(1) n-butyl ether, $Bu_2O$, 100 cc. ≅ 3 ml. solvent/g. of reactants,
(2) Phosphonoacetic acid, $H_2O_3PCH_2COOH$, 14.7 g. (95% active) = 0.10 mole,
(3) Phosphorous acid, $HPO_3H_2$, 8.3 g. (98.5% active) = 0.10 mole,
(4) Phosphorus trichloride, $PCl_3$, 10.3 ml. = 0.118 mole (.018 mole to offset $H_2O$ in #2 and 3)

The first three reagents listed were heated to 90° C. with stirring; the reagents were nearly all dissolved but not completely. The $PCl_3$ was added and the temperature held near 90° C. A second liquid layer precipitated which changed to an unstirrable viscous gum within 15 minutes after the $PCl_3$ addition. The temperature was maintained at 90 to 125° C. for an additional 7 hours, with no change in the reaction mixture. Although the product was too viscous to be poured from the reaction vessel and weighed, a portion was dissolved in water and analyzed by $P^{31}$ mr. and found to be 91% ethane-1-hydroxy-1,1,2-triphosphonic acid (and/or its condensates), 6% $HPO_3H_2$, and 3% $H_2O_3PCH_2COOH$.

Example IV

The conditions here differ from those in Example I mainly in the reduced anhydrizing power ($PCl_3$).

The reagents were combined in the order listed:

(1) Di-n-propyl sulfone, $Pr_2SO_2$, 150 cc. ≅ 3 ml. solvent/g. of reactants,
(2) Phosphonoacetic acid, $H_2O_3PCH_2COOH$, 21.0 g. (99% active) = 0.15 mole,
(3) Phosphorous acid, $HPO_3H_2$, 16.7 g. (98.5% active) = 0.20 mole,
(4) Phosphorus trichloride, $PCl_3$, 8.8 ml. = 0.10 mole The first three reagents listed were warmed to 50° C. to form a clear solution; the $PCl_3$ was then added. The reaction mixture was warmed to 90° C. over a 45-minute period; at this point, the mixture became two immiscible liquids. The temperature was raised to 127° C. in the next 40 minutes and maintained at that temperature. After 5½ hours at 127° C., a portion of the bottom viscous layer was analyzed by $P^{31}$ mr. and found to contain 57% ethane-1-hydroxy-1,1,2-triphosphonic acid (and/or its condensates), 22% $HPO_3H_2$, 11% $H_2O_3PCH_2COOH$, 6% $H_3PO_4$, and 4% unidentified phosphorus compounds. The remainder of the reaction mixture was maintained at 127° C. for an additional 15½ hours. The reaction product at this point was 76% ethane-1-hydroxy-1,1,2-triphosphonic acid (and/or its condensates), 10% $HPO_3H_2$, 5% $H_2O_3PCH_2COOH$, and 9% $H_3PO_4$ by $P^{31}$ mr. analysis.

Example V

The main deviation from Example IV is that the anhydrizing powder was added as phosphorus anhydride, $P_4O_6$, instead of phosphorus trichloride, $PCl_3$; also more solvent was used.

The following reagents were added to a reaction vessel in the order listed:

(1) Di-n-propyl sulfone, $Pr_2SO_2$, 64 cc. 4 ml. solvent/g. of reactants,
(2) Phosphonoacetic acid, $H_2O_3PCH_2COOH$, 8.4 g. (99% active) = 0.06 mole,
(3) Phosphorous acid, $HPO_3H_2$, 3.28 g. = 0.04 mole,
(4) Phosphorous anhydride, $P_4O_6$, 2.5 ml. = 0.022 mole (0.002 mole excess used to allow for visible $P_4O_{10}$ impurity)

The first three reagents listed were warmed, while stirring, to 70° C. to form a clear solution; the $P_4O_6$ was then added. The pot temperature rose spontaneously to 77° C. when the $P_4O_6$ was added, and the reaction mixture became two immiscible liquids. The reaction temperature was raised to 120° C. and maintained for 5 hours; the reaction mixture remained two immiscible liquids. The bottom viscous layer was analyzed by $P^{31}$ mr. and found to contain 67% ethane-1-hydroxy-1,1,2-triphosphonic acid (and/or its condensates), 23% $HPO_3H_2$, and 10% $H_2O_3PCH_2COOH$

Example VI

Phosphonoacetic acid (14.3 g., 0.10 mole of 97.7% active) and 8.3 g. of phosphorous acid (8.3 g., 0.10 mole of 98.5% active) were added to 100 cc. nitrobenzene. The slurry was heated, while stirring, to 60° C. for 15 minutes, but no change could be noted in the undissolved solids. To the slurry was added 9.5 cc. $PCl_3$, which is equivalent to 0.10 mole, plus an excess to react with the water (as percent inactive) found in the other two reagents. The reaction mixture changed from a loose slurry to a gummy mass of solids and a clear solvent when the $PCl_3$ was added. The solids then became less viscous, and finely a clear syrup formed a bottom layer as the mixture was heated to 106° C. over a 3-hour period. During the following 2½ hours, the temperature was increased to 108° C. and the bottom layer became more and more viscous. The reaction was stopped at this point and the clear solvent layer (top layer) was removed and discarded. The bottom layer was dissolved in 100 cc. of $H_2O$ and refluxed for 16 hours. The aqueous solution was extracted with chloroform to remove traces of nitrobenzene and then evaporated to remove most of the water. The product was 22.9 g. of a syrup, which was 69% ethane-1-hydroxy-1,1,2-triphosphonic acid; 20% $HPO_3H_2$; and 11% $H_2O_3PCH_2COOH$ by $P^{31}$ mr. analysis.

Example VII

Phosphonoacetic acid (14.3 g.-0.10 mole of 97.7% active) and phosphorous acid (8.3 g.-0.10 mole of 98.5% active) were dissolved in 100 c. of bis-2-methoxyethyl ether, $(CH_3OCH_2CH_2)_2O$, at 30° C. with stirring. To the clear solution was added 9.5 cc. of $PCl_3$, which is equivalent to 0.10 mole, plus an excess to react with the water (percent inactive) found in the other two reagents. The clear solution became slightly turbid when the $PCl_3$ was added. The reaction mixture was heated to 80° C. over a 1-hour period, at which time the mixture was a slurry of white solids. Heating and stirring were continued to 101° C. over the following two hours; a portion of the mixture was removed and the white solids identified as crystals by microscopic examination. On further heating and stirring, the crystals became gummy and finally a viscous syrup. The reaction was stopped after an additional two hours, at a maximum temperature of 106° C. The top layer of the reaction mixture was decanted and discarded. The bottom layer was dissolved in 100 cc. of water and refluxed for 3 hours. The solution was then evaporated to remove most of the water. The product was 36 g. of a viscous syrup which by $P^{31}$ mr. analysis was 92% ethane-1-hydroxy-1,1,2-triphosphonic acid and 8% $HPO_3H_2$.

Example VIII

Phosphonoacetic acid (14.3 g.-0.10 mole of 97.7% active) and phosphorus acid (8.3 g.-0.10 mole of 98.5% active) were added to 100 cc. of 1,1,2,2-tetrachloroethane, $Cl_2CHCHCl_2$. The slurry was heated to 55° C. for 30 minutes, while stirring, but the solids would not dissolve. To the slurry was added 9.5 cc. of $PCl_3$, which is equivalent to 0.10 mole, plus an excess to react with the water (percent inactive found in the other two reagents. The solids changed to a gummy mass and finally to a clear viscous bottom layer as the mixture was heated to 112° C. over a 3-hour period. During the following 2½ hours, at a temperature of 109–112° C., the bottom layer became more viscous and was deposited as a syrup on the walls of the flask. The clear solvent layer was removed and discarded; the bottom layer was dissolved in 100 cc. of water and refluxed for 16 hours. The aqueous solution was extracted with $CHCl_3$ to remove traces of $$Cl_2CHCHCl_2$$

and thus evaporated to remove most of the water. The product was 25.7 g. of a syrup which was 59% ethane-1-hydroxy-1,1,2-triphosphonic acid, 25% $HPO_3H_2$, and 16% $H_2O_3PCH_2COOH$ by $P^{31}$ mr. analysis.

Example IX

This example involves the isomeric ethanehydroxytriphosphonate compound, namely, ethane-2-hydroxy-1,1,2-triphosphonic acid. It was made by phosphonate ester reactions in which the ester alkyl was isopropyl. Thus, hydrogen diisopropyl phosphite was added to the double bond of the 2-methoxyethene tetraisopropylphosphonate, $CH_3OCH\text{—}C(PO_3R_2)_2$, in the presence of a catalyst. The product of this reaction is the methyl ether of the desired 2-hydroxytriphosphonate ester. Details of the preparation follow.

One mole, 166.16 gms. of $HP(O)(OC_3H_7)_2$ was allowed to react with 0.135 mole, 3.1 gm. of sodium while being held at 25–35° C. by external cooling. The solution was then added over a 15-minute period to 0.544 mole, 210 gms., of $CH_3OCH\text{—}C[PO_3(C_3H_7)_2]_2$ giving sufficient evolution of heat to raise the solution temperature to 50° C., where it was held for 2 hours. After heat evolution ceased, the solution was heated to 95° C. for 30 minutes. A $P^{31}$ mr. spectrum of the crude product showed that less than 7% of the unsaturated starting material remained unreacted.

The product was dissolved in water and esters removed by $HCCl_3$ extraction. The choloroform and excess phosphite were removed by vacuum distillation. The residual ester was converted to the acid by refluxing with a 100 molar percent excess of concentrated aqueous HCl/ for 4 hours, allowing isopropyl chloride to distill out of the acidic medium. The water and HCl were removed by vacuum distillation to leave the viscous phosphonic acid. A $P^{31}$ mr. spectrum of this material showed greater than 90% of a single compound with a shift of −17.9 p.p.m., the rest being miscellaneous unidentified impurities.

The main component was purified by crystallizing the aniline salt to a constant-melting (284–6° C.) product. This was converted to the $Na_4H_2$ salt by titration with NaOH and removing the freed aniline by ether extraction. The aqueous salt solution was evaporated to dryness and the ethane-2-hydroxy-1,1,2-triphosphonate $Na_4H_2$ salt analyzed.

*Analysis.*—Calculated for $C_2H_5O_{10}P_3Na_4$: C, 6.42%; H, 1.35%; P, 24.9%. Found: C, 5.6%; H, 1.3%; P, 26.7%.

In a nephelometric caprate test for calcium sequestering, the following data at 25° C. were obtained:

| pH: | Sequestering efficiency |
|---|---|
| 9 | 3.6 |
| 10 | 16.9 |
| 11 | 20.8 |

Comparison with sodium tripolyphosphate, $Na_5P_3O_{10}$, and ethanehydroxy-1,1,2-triphosphonate can be made by reference to data presented in Example 1.

Another of the surprising discoveries of the present invention is the remarkable detergency building property of the novel ethanehydroxytriphosphonate compounds described above. The magnitude of the cleaning power over previously known organic and inorganic detergency builder compounds was totally unexpected. As a result of this discovery, one of the more important embodiments of the present invention is a detergent composition which contains an ethanehydroxytriphosphonate compound as a builder component in the complete formulation.

Built detergent compositions ranging from lightly built to medium built to heavily built have been avaliable for several years. These compositions most generally are in the form of solids and liquids and are used for light, medium, or heavy duty laundering uses. The meaning of the terms lightly built, medium built, and heavily built are derived from the relative amount of builder which is present in the total formulation; and the concept behind built detergent compositions is based on the knowledge that when certain substances are added to the active detergent component or components of washing compositions, an increase in cleaning ability or whiteness maintenance, or both, is obtained, even though the washing solution used may contain less of the active detergent. Substances capable of producing this effect are known as builders, and it is in this context that the ethanehydroxytriphosphonate compounds of the present invention are especially valuable. Light duty detergent compositions are those used for washing fine fabrics or lightly soiled fabrics. Milder conditions are generally used in light duty applications, such as, for instance, cool or warm water and only slight wringing or agitating. Dishwashing compositions can also be considered as light duty detergent compositions. Heavy duty laundering compositions, on the other hand, are those intended for washing heavily soiled fabrics such as are generally found in an ordinary household wash. Medium duty laundering compositions can alternatively be used for dishwashing, fine fabric laundering, or even for washing fairly heavily soiled fabrics.

It is surprising that the compounds of the present invention find such wide applications as those listed above. It was equally as surprising, however, to discover that in formulating detergent compositions described above, the active detergent portion of the complete compositions could be virtually any of the known or commercially available surface active detergent compounds. In its broadest terms, therefore, this embodiment of the present invention contemplates a detergent composition comprising an active detergent portion which can be any surface active compound having useful detergent properties and an effective amount of a builder comprised of the ethanehydroxytriphosphonate compounds described herein.

It is to be noted that while an active detergent or a mixture of detergent compounds represent an essential and indispensable ingredient in the detergent compositions presently being contemplated, the major discovery resides in the useful builder properties of the ethanehydroxytriphosphonate compounds.

According to the present invention, a detergent composition should contain an active detergent ingredient and an ethanehydroxytriphosphonate builder in a ratio, by weight, of from about 2:1 to about 1:10 and, preferably, in a weight ratio of detergent to builder of from 1:1 to about 1:6. It is customary to speak of the ingredients in detergent compositions as being by weight. By way of example, a detergent composition prepared according to the present invention in which the active to builder ratio is about 2:1 or 1:1 on a weight basis is especially useful as a dishwashing composition or a fine fabric laundering composition. A detergent composition comprising active detergent to builder ratio of 1:1.5 or 1:1.9 has excellent performance characteristics for washing lightly soiled items in an ordinary household wash. Yet further by way of illustration, heavily soiled fabrics are best laundered with detergent compositions in which the active detergent to builder ratio is from about 1:2 to about 1:10.

It will be seen, therefore, that in practicing the present invention, it is only necessary to mix at least one surface active detergent compound having the desired sudsing, cleaning, mildness characteristics and the like, with an effective amount of an ethanehydroxytriphosphonate builder compound in the useful by-weight proportions set forth above.

The active detergent ingredients can include anionic, nonionic, ampholytic and zwitterionic detergent compounds, or mixtures of compounds selected from these general classes of detergents. Each of these classes is illustrated at length as follows:

A. Anionic soap and non-soap synthetic detergents.—This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Napthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap.

This class of detergents also includes water-soluble salts, particularly the alkali metal salts of organic sulfuric reaction products having in their molecular structure an alkyl radical containing from about 8 to about 22 carbon atoms and a sulfonic acid or sulfuric acid ester radical. (Included in the term alkyl is the alkyl portion of higher acyl radicals.) Examples of this group of synthetic detergents which form a part of the preferred built detergent compositions of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, in straight chain or branched chain configuration, especially those of the type described in United States Letters Patents No. 2,220,099 and 2,477,383; sodium alkyl glyceryl ether sulfonates, especially those ethers of higher alcohols derived from tallow and coconut oil; sodium coconut oil fatty acid monoglyceride sulfonates and sulfates; sodium or potassium salts of sulfuric acid esters of the reaction product of one mole of a higher fatty alcohol (e.g., tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain about 8 to about 12 carbon atoms.

Additional examples of anionic non-soap synthetic detergents which come within the terms of the present invention are the reaction product of fatty acids esterified with isothionic acid and neutralized with sodium hydroxide where, for example, the fatty acids are derived from coconut oil; sodium or potassium salts of fatty acid amide of methyl tauride in which the fatty acids, for example, are derived from coconut oil. Other anionic synthetic detergents of this variety are set forth in United States Letters Patents 2,486,921; 2,486,922; and 2,396,278.

Still other anionic synthetic detergents include the class designated as succinamates. This class includes such surface active agents as disodium N-octadecylsulfo succinamate; tetrasodium N - (1,2 - dicarboxyethyl)-N-octadecyl - sulfo - succinimiate; diamyl ester of sodium sulfosuccinic acid; dihexyl ester of sodium sulfosuccinic acid; dioctyl ester of sodium sulfosuccinic acid.

Anionic phosphate surfactants are also useful in the present invention. These are surface active materials having substantial detergent capability in which the anionic solubilizing group connecting hydrophobic moieties is an oxy acid of phosphorus. The more common solubilizing groups, of course, are —$SO_4H$, —$SO_3H$, and —$CO_2H$. Alkyl phosphate esters such as (R—O)$_2$PO$_2$H and

in which R represents an alkyl chain containing from about 8 to about 20 carbon atoms are useful.

These esters can be modified by including in the molecule from one to about 40 alkylene oxide units, e.g., ethylene oxide units. Formulae for these modified phosphate anionic detergents are

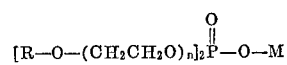

or

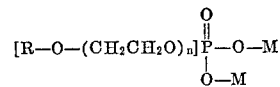

in which R represents an alkyl group containing from about 8 to 20 carbon atoms, or an alkylphenyl group in which the alkyl group contains from about 8 to 20 carbon atoms, and M represents a soluble cation such as hydrogen, sodium, potassium, ammonium or substituted ammonium; and in which $n$ is an integer from 1 to about 40.

A specific anionic detergent which has also been found excellent for use in the present invention is described more fully in the U.S. patent application of Phillip F. Pflaumer and Adriaan Kessler, Ser. No. 423,364 filed Jan. 4, 1965, now abandoned. This detergent comprises by weight from about 30% to about 70% of Component A, from about 20% to about 70% of Component B, and from about 2% to about 15% of Component C, wherein:

(a) said Component A is a quaternary mixture of double bond positional isomers of water-soluble salts of alkene-1-sulfonic acids containing from about 10 to about 24 carbon atoms, said mixture of positional isomers including by weight about 10% to about 25% of an alpha-beta unsaturated isomer, about 30% to about 70% of a beta-gamma unsaturated isomer, about 5% to about 25% of a gamma-delta unsaturated isomer, and about 5% to about 10% of a delta-epsilon unsaturated isomer;

(b) said Component B is a mixture of water-soluble salts of bifunctionally-substituted sulfur-containing saturated aliphatic compounds containing from about 10 to about 24 carbon atoms, the functional units being hydroxy and sulfonate radicals with the sulfonate radical always being on the terminal carbon and the hydroxyl radical being attached to a carbon atom at least two carbon atoms removed from the terminal carbon atoms; and (c) said Component C is a mixture of water-soluble salts of highly polar saturated aliphatic compounds, each having two sulfur-containing moieties, one of which must be a sulfonate group attached to the terminal carbon atom and the other moiety selected from the group consisting of sulfonate and sulfate radicals attached to a carbon atom at least two carbon atoms removed from the terminal carbon atom, said compounds containing from about 10 to about 24 carbon atoms.

B. Nonionic synthetic detergents.—Nonionic synthetic detergents may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

For example, a well known class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

(1) The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

(2) Those derived from the condensation of ethylene oxide with the product resulting from the reaction of propylene oxide and ethylene diamine. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000, are satisfactory.

(3) The condensation product of aliphatic alcohols having from 8 to 22 carbon atoms, in either straight chain or branched chain configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms.

(4) Nonionic detergents include nonyl phenol condensed with either about 10 or about 30 moles of ethylene oxide per mole of phenol and the condensation products of coconut alcohol with an average of either about 5.5 or about 15 moles of ethylene oxide per mole of alcohol and the condensation product of about 15 moles of ethylene oxide with one mole of tridecanol.

Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan; bis-(N-2-hydroxyethyl) lauramide; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; and di-isooctylphenol condensed with 15 moles of ethylene oxide.

(5) A detergent having the formula $R^1R^2R^3N \to O$ (amine oxide detergent) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and 0 ether linkages, and each $R^2$ and $R^3$ are selected from the group consisting of alkyl radicals and hydroxyalkyl radicals containing from 1 to about 3 carbon atoms;

Specific examples of amine oxide detergents include: dimethyldodecylamine oxide, dimethyltetradecylamine oxide, ethylmethyltetradecylamine oxide, cetyldimethylamine oxide, dimethylstearylamine oxide, cetylethylpropylamine oxide, diethyldodecylamine oxide, diethyltetradecylamine oxide, dipropyldodecylamine oxide, bis(2-hydroxyethyl)dodecylamine oxide, bis-(2-hydroxethyl)-3-dodecoxy - 1 - hydroxypropyl amine oxide, (2-hydroxypropyl)methyltetradecylamine oxide, dimethyloleyamine oxide, dimethyl-(2-hydroxydodecyl)amine oxide, and the corresponding decyl, hexadecyl and octadecyl homologs of the above compounds.

(6) A detergent having the formula $R^1R^2R^3P \to O$ (phosphine oxide detergent) wherein $R'$ is an alkyl group containing from about 10 to about 28 carbon atoms, from 0 to about 2 hydroxy groups and from 0 to about 5 ether linkages, there being at least one moiety of $R'$ which is an alkyl group containing from about 10 to about 18 carbon atoms and 0 ether linkages, and each of $R^2$ and $R^3$ are selected from the group consisting of alkyl radicals and hydroxyalkyl radicals containing from 1 to about 3 carbon atoms.

Specific examples of the phosphine oxide detergents include:

dimethyldodecylphosphine oxide,
dimethyltetradecylphosphine oxide,
ethylmethyltetradecylphosphine oxide,
cetyldimethylphosphine oxide,
dimethylstearylphosphine oxide,
cetylethylpropylphosphine oxide,
diethyldodceylphosphine oxide,
diethyltetradecylphosphine oxide,
dipropyldodecylphosphine oxide,
bis-(hydroxymethyl)dodecylphosphine oxide, bis-(2-hydroxyethyl)dodecylphosphine oxide,
(2-hydroxypropyl)methyltetradecylphosphine oxide,
dimethyloleylphosphine oxide, and
dimethyl-(2-hydroxydodecyl)phosphine oxide and the corresponding decyl, hexadecyl, and octadecyl homologs of the above compounds.

(7) A detergent having the formula

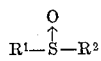

(sulfoxide detergent) wherein $R^1$ is an alkyl radical containing from about 10 to about 28 carbon atoms, from 0 to about 5 ether linkages and from 0 to about 2 hydroxyl substituents at least one moiety of $R^1$ being an alkyl radical containing 0 ether linkages and containing from about 10 to about 18 carbon atoms, and wherein $R^2$ is an alkyl radical containing from 1 to 3 carbon atoms and from one to two hydroxyl groups.

octadecyl methyl sulfoxide
dodecyl methyl sulfoxide
tetradecyl methyl sulfoxide
3-hydroxytridecyl methyl sulfoxide
3-methoxytridecyl methyl sulfoxide
3-hydroxy-4-dodecoxybutyl methyl sulfoxide
octadecyl 2-hydroxyethyl sulfoxide
dodecylethyl sulfoxide.

C. Ampholytic synthetic detergents.—Ampholytic synthetic detergents can be broadly described as derivatives of aliphatic or aliphatic derivatives of heterocyclic secondary and tertiary amines, in which the aliphatic radical may be straight chain or branched and wherein one of the aliphatic substituents contains from about 8 to 18 carbon atoms and at least one contains an anionic water-solubilizing group, e.g., carboxy, sulfo, sulfato, phosphato, or phosphono. Examples of compounds falling within this definition are soduim 3-(dodecylamino)-propionate

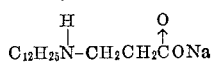

sodium 3-(dodecylamino)propane-1-sulfonate

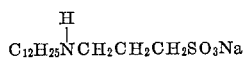

sodium 2-(dodecylamino)ethyl sulfate

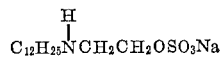

sodium 2-(dimethylamino)octadecanoate

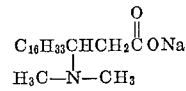

disodium 3-(N-carboxymethyldodecylamino)propane-1-sulfonate

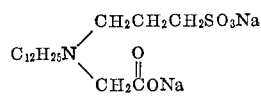

disodium 2-(oleylamino)ethyl phosphate

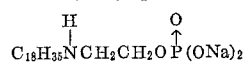

disodium 3-(N-methylhexadecylamino)propyl-1-phosphonate

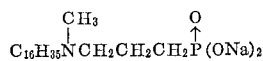

disodium octadecyliminodiacetate

sodium 1-carboxymethyl-2-undecylimidazole

disodium 2-[N-(2-hydroxyethyl)octadecylamino]ethyl phosphate

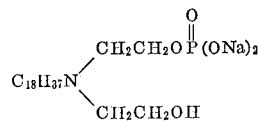

and sodium N,N-bis-(2-hydroxyethyl)-2-sulfato-3-dodecoxypropylamine

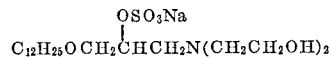

D. Zwitterionic synthetic detergents.—Zwitterionic synthetic detergents can be broadly described as derivatives of aliphatic quaternary ammonium and phosphonium or tertiary sulfonium compounds, in which the cationic atom may be part of a heaterocyclic ring, and in which the aliphatic radical may be straight chain or branched, and wherein one of the aliphatic substituents contains from about 8 to 18 carbon atoms, and at least one aliphatic substitutent contains an anionic water-solubilizing group, e.g., carboxy, sulfo, sulfato, phosphato, or phosphono. Examples of compounds falling within this definition are 3-(N,N-dimethyl-N-hexadecyl-ammonio) - 2 - hydroxypropane-1-sulfonate

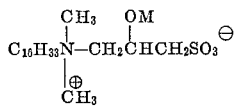

3-(N,N-dimethyl-N-hexadecylammonio)propane-1-sulfonate

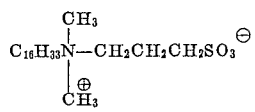

2-(N,N-dimethyl-N-dodecylammonio)acetate

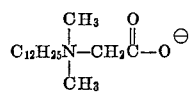

3-(N,N-dimethyl N-dodecylammonio)propionate

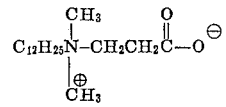

2-(N,N-dimethyl-N-octadecylammonio)ethyl sulfate

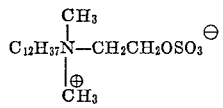

2-(trimethylammonio)ethyl dodecylphosphonate

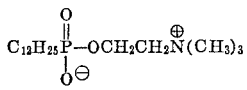

ethyl 3-(N,N-dimethyl-N-dodecylammonio)propylphosphonate

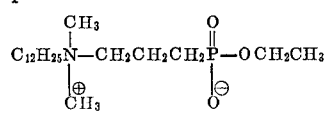

3-(P,P-dimethyl-P-dodecylphosphonio)-propane 1-sulfonate

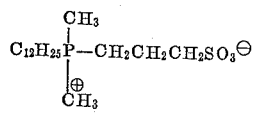

2-(S-methyl-S-tert.-hexadecyl-sulfonio)ethane-1-sulfonate

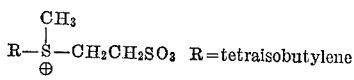

3-(S-methyl-S-dodecylsulfonio)propionate

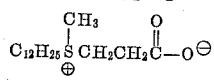

sodium 2-(N,N-dimethyl-N-dodecylammonio)ethyl phosphonate

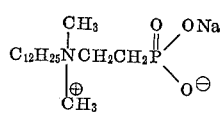

4-(S-methyl-S-tetradecylsulfonio)butyrate

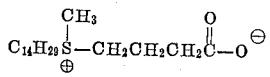

1-(2-hydroxyethyl)-2-undecylimidazolium-1-acetate

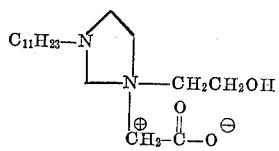

2-(trimethylammonio)octadecanoate

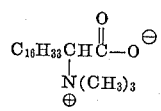

and 3-(N,N-bis-(2-hydroxyethyl)-N-octadecylammonio)-2-hydroxypropane-1-sulfonate.

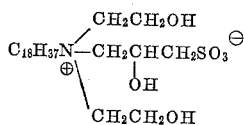

Some of these detergents are described in the following U.S. Patents: 2,129,264; 2,178,353; 2,774,786; 2,813,898; and 2,828,332.

A detergent composition prepared according to the present invention contains as essential ingredients (a) a detergent ingredient and (b) a builder ingredient. In its simplest terms, a composition can contain a single detergent compound and a single builder compound. On the other hand, it frequently is desirable to formulate a detergent composition in which the active detergent portion consists of mixtures of detergent compounds selected from the foregoing classes. Thus, for example, the active ingredient can consist of a mixture of two or more anionic detergents; or a mixture of an anionic detergent and a nonionic detergent; or, by way of another example, the active detergent can be a ternary mixture of two anionic detergents and a zwitterionic detergent.

The part of the complete formulation that functions as a builder can likewise be composed of a mixture of builder compounds. For example, the ethane hydroxy triphosphonate compounds described herein can be mixed together with other water-soluble inorganic alkaline builder salts such as sodium tripolyphosphate or potassium prophosphates. Another example is a binary builder mixture consisting of an ethane hydroxy triphosphonate compound and a water-soluble organic builder salt such as water-soluble salts of nitrilotriacetic acid, ethylene-diaminetetraacetic acid, ethane-1-hydroxy-1,1-diphosphonic acid. Still further, the builder component of a complete formulation can consist of ternary mixtures of these several types of builder compounds.

Water-soluble inorganic alkaline builder salts which can be used in this invention in combination with the novel ethane hydroxy triphosphonate compounds described herein are alkali metal carbonates, borates, phosphates, polyphosphates, bicarbonates and silicates. Ammonium and substituted ammonium salts of these materials can also be used. Specific examples of suitable salts are sodium tripolyphosphate (mentioned above), sodium carbonate, sodium tetraborate, sodium and potassium pyrophosphate, sodium and ammonium bicarbonate, potassium tripolyphosphate, sodium hexametaphosphate sodium sesquicarbonate, sodium orthophosphate and potassium bicarbonate.

Examples of suitable organic water-soluble organic alkaline sequestrant builder salts which can be used mixed with the ethane hydroxy triphosphonate compounds of this invention are alkali metal (sodium, potassium, lithium), ammonium or substituted ammonium, aminopolycarboxylates, e.g., the above mentioned sodium and potassium ethylenediaminetetraacetate, sodium and potassium N-(2-hydroxyethyl)ethylenediaminetriacetates, sodium and potassium nitrilotriacetates and sodium, potassium and triethanolammonium N-(2-hydroxyethyl)-nitrilodiacetates. The alkali metal salts of phytic acid, e.g., sodium phytate, are also suitable as organic alkaline sequestrant builder salts. Certain other organic builders which can be used in admixture with the ethane hydroxy triphosphonates described herein are water-soluble salts of ethane hydroxy diphosphonic acid, methylene diphosphonic acid, and the like.

The specific action of the builder mixtures of this invention will vary to some extent depending upon the ratio of active detergent to builder mixture in any given detergent composition. There will be considerable variation in the strengths of the washing solutions employed by different housewives, i.e., some housewives may tend to use less or more of the detergent compositions than will others. Moreover, there will be variations in temperature and in soil loads as between washing operations. Further, the degree of hardness of the water used to make up the washing solutions will also bring about apparent differences in the cleaning power and whiteness maintenance results. Finally, different fabrics will respond in somewhat different ways to different detergent compositions. The best type of detergent composition for household use would in theory be a composition which accomplishes an excellent cleaning and whiteness maintenance effect under the most diverse cleaning conditions. The built detergent compositions of this invention are especially valuable in this respect.

The builder mixtures taught herein are very efficient, and, in general, can be used to permit the attainment of equal detergency with a smaller total quantity of builder in relation to the total quantity of active detergent ingredient.

The built detergent compositions of the present invention can be formulated and prepared into any of the several commercially desirable solid and liquid forms including, for example, granules, flakes, tablets, and water-based and alcohol-based liquid detergents, and the like. According to one embodiment of the present invention, solid detergent compositions are prepared containing an active detergent (sole active or a mixture of detergents) and a builder (single compound or a mixture) in the by weight ratio (detergent to builder) of about 2:1 to about 1:10; and preferably from about 1:1 to about 1:6. A specal embodiment of this invention is a built liquid detergent composition containing an active detergent and a builder in the by weight ratio (detergent to builder) of 3:1 to about 1:10; preferably 2:1 to about 3:1. The potassium salts of the ethane hydroxy triphosphonates are especially useful in liquid formulations due to the increased solubility characteristics of potassium over sodium.

Liquid detergent compositions generally present special problems to the formulator in view of the peculiarities inherent in aqueous systems and the special requirements of solubility of the ingredients, and more especially, their physical and chemical stability in such mediums. It is well known, for instance, that sodium tripolyphosphate, which is outstanding in its behavior in granular compositions, is generally regarded as being unsuited as a sole builder for built liquid detergents. It has a marked propensity to hydrolyze the lower forms of phosphate compounds which are less desirable builders. As a practical matter, therefore, it has been necessary to use a more stable form of a phosphate builder, i.e., pyrophosphate, notwithstanding the fact that the pyrophosphate is a weaker detergency builder than tripolyphosphate. The ethane hydroxy triphosphonate compounds solve this particular problem because they are, at the same time, much better builders than tripolyphosphates while being hydrolytically stable. In view of the increasing acceptance by the general public of built liquid detergent compositions for virtually all washing and cleaning situations including laundering and dishwashing, it is a very significant contribution of this invention that an improved built liquid detergent product is made possible that will far outperform known liquid detergents while at the same time being free of the troublesome problem of stability.

Built liquid detergents are usually water based or have a mixture of water and alcohol in the liquid vehicle. Such liquid vehicles can be satisfactorily employed in formulating a composition according to the present invention. Accordingly, a sample built liquid detergent composition of this invention can consist essentially of a detergent ingredient (a single detergent or a mixture of detergents) and an ethane hydroxy triphosphonate containing builder ingredient (either as a single builder or in admixture with other builders), with the balance of the composition to 100% being a liquid vehicle such as water or a water-alcohol mixture, and the like.

The built detergent compositions of the present invention perform at their maximum level in a washing solution which has a pH in the range of from about 8 to about 11.5. Within this broad range, it is preferred to operate at a pH of from about 9.5 to 11. The detergent and the builder can be neutralized to a degree sufficient to insure that this pH prevails in any washing solution. If desired, other alkaline materials can be added to the complete formulation to provide for any pH adjustments desired. A preferred embodiment is to have the detergent composition whether in solid or liquid form provide a pH in the aforementioned ranges at the usual recommended usage levels.

In a finished detergent formulation, there can be present other materials which make the product more effective or more aesthetically attractive. The following are mentioned only by way of example. A water-soluble sodium carboxymethyl cellulose can be added in minor amounts to inhibit soil redeposition. Tarnish inhibitors such as benzotriazole or ethylenethiourea can also be added in amounts up to about 3%. Fluorescers and brighteners, perfumes, coloring agents, while not per se essential in the compositions of this invention, can be added in minor amounts. As already mentioned, an alkaline material or alkali such as sodium or potassium hydroxide can be added as supplementary pH adjusters. Other usual additives include sodium sulfate, sodium carbonate, water, and the like. Corrosion inhibitors are also frequently used. Water-soluble silicates are highly effective corrosion inhibitors and can be added if desired at levels of from about 3% to about 8% by weight of the total composition. Alkai metal, preferably potassium and sodium silicates, are preferred having a weight ratio of $SiO_2:M_2O$ of from 1.0:1 to 2.8:1. (M refers to sodium or potassium.) Sodium silicate having a ratio of $SiO_2:Na_2O$ of from about 1.6:1 to 2.45:1 is especially preferred.

In the embodiment of this invention which provides for a built liquid detergent, a hydrotropic agent may be found desirable. Suitable hydrotropes are water-soluble alkali metal salts of toluenesulfonate, benzenesulfonate, and xylene sulfonate. Preferred hydrotropes are potassium or sodium toluenesulfonates. The hydrotrope salt may be added, if desired, at levels up to about 12%. While a hydrotrope will not ordinarily be found necessary, it can be added, if so desired, for any reason such as to function as a solubilizing agent and to produce a product which retains its homogeneity at a low temperature.

The following compositions, in which the percentages are by weight, will serve to illustrate, but not limit, the invention. Each of the compositions in the following examples give in solution a pH within the desired range of from about 8 to about 12.

Example A

An excellent granular built detergent composition according to this invention has the following formulation:

| | Percent |
|---|---|
| Sodium alkyl benzene sulfonate in which the alkyl is a straight chain dodecyl radical | 18 |
| Hexasodium ethane-1-hydroxy-1,1,2-trisphosphonate | 50 |
| Sodium sulfate | 15 |
| Sodium silicate (ratio of $SiO_2:Na_2O$ of 2:1) | 7 |
| Water | 10 |

This heavily built detergent composition is especially valuable for laundering heavily soiled clothes.

The straight chain dodecyl benzene sodium sulfonate in the preceding composition can be replaced on an equal weight basis by either branched chain dodecyl benzene sodium sulfonate, sodium tallow alkyl sulfate, sodium coconut oil alkyl sulfate, sodium olefin sulfonate as described in the specification derived from alpha olefines having an average of 14 carbon atoms in the molecule, or a mixture of straight chain dodecyl benzene sodium sulfonate and sodium tallow alkyl sulfate on an equal weight basis. The hexasodium ethane-1-hydroxy-1,1,2-triphosphonate builder can be replaced by a sodium salt of ethane-2-hydroxy-1,1,2-triphosphonic acid; a 1:1 mixture of sodium tripolyphosphate and hexasodium ethane-1-hydroxy-1,1,2-triphosphonate; or a 1:1:1 ternary mixture of sodium tripolyphosphate, sodium nitrilotriacetate and sodium ethane-1-hydroxy-1,1,2-triphosphonate.

Example B

Another granular detergent composition having outstanding cleaning properties has the following formulation:

| | Percent |
|---|---|
| Straight chain dodecyl benzene sodium sulfonate (anionic detergent) | 4 |
| Sodium tallow alkyl sulfate (anionic detergent) | 4 |
| Dodecyl methyl sulfoxide | 2 |
| Hydrogenated marine oil fatty acid | 2 |
| Tetrasodium ethane-1-hydroxy-1,1,2-triphosphonate | 60 |
| Sodium silicate (ratio of $SiO_2:Na_2O$ of 1.6:1) | 10 |
| Sodium sulfate | 12 |
| Water | 6 |

In this example, the total active detergent of 10% can be totally the nonionic species. In addition, the 2% dodecyl methyl sulfoxide can be replaced either by an alkyl-phenol ethylene oxide condensate formed by a condensation reaction between dodecyl phenol and 5 moles of ethylene oxide per mole of dodecyl phenol, or by 3-(dodecyldimethylammonio)-2-hydroxy propane-1-sulfonate.

The tetrasodium salt of the trisphosphonate builder can be added as the salt or it can be present as the free acid neutralized in situ to any salt form ranging from the monosodium or monopotassium salt to the fully neutralized hexasodium or hexapotassium salt.

Example C

This is also an example of a granular detergent composition of outstanding efficiency.

| | Percent |
|---|---|
| Straight chain dodecylbenzene sodium sulfonate [1] (anionic detergent) | 20 |
| Trisodium salt ethane-1-hydroxy-1,1,2-tri phosphonic acid | 49 |
| Sodium silicate (ratio $Si_2O:Na_2O$ of 2:1) | 6 |
| Sodium sulfate | 14 |
| Water | 11 |

[1] This detergent compound is also referred to us linear dodecyl benzene sodium sulfonate.

In this example, the anionic detergent can be replaced on an equal weight percentage with an olefin sodium sulfonate as described above in whch the olefin sulfonate consists of a mixture of chain lengths ranging from 10 to about 18 carbon atoms.

EXAMPLE D

The following formulation is for a granular detergent composition that is an outstanding detergent composition:

| | Percent |
|---|---|
| Dodecyldimethylamine oxide (nonionic detergent) | 16.0 |
| Disodium ethane-1-hydroxy-1,1,2-triphosphonate | 40.0 |
| Toluene sulfonate | 1.8 |
| Sodium silicate (ratio of $SiO_2:Na_2O$ of 2:1) | 8.0 |
| Sodium sulfate | 2.0 |
| Diethanolamide of coconut fatty acid | 1.9 |
| Benzotriazole | 0.2 |
| Balance to 100% water. | |

In this composition, the nonionic detergent can be replaced by tetradecyl dimethylphosphine oxide, sodium-3-dodecylaminopropionate, sodium - 3 - dodecylaminopropanesulfonate, 3-(N,N-dimethyl-N-hexadecylammonio)-propane-1-sulfonate or 3-(N,N-dimethyl-N-dodecylammonio)-2-hydroxypropane-1-sulfonate. Twenty percent of the builders can be replaced with an equal weight replacement of trisodium ethane-1-hydroxy-1,1-diphosphonate.

EXAMPLE E

A liquid detergent which is especially effective in cool water as a heavy duty detergent and has the following composition:

| | Percent |
|---|---|
| 3-(N,N-dimethyl - N - hexadecylammonio)-2-hydroxy-propane-1-sulfonate | 12.0 |
| Tetrasodium ethane - 1 - hydroxy-1,1,2-triphosphonate | 20.0 |
| Sodium silicate (ratio of $SiO_2:Na_2O$ of 1.6:1) | 3.8 |
| Potassium toluenesulfonate | 8.5 |
| Sodium carboxymethyl hydroxymethyl cellulose | .3 |
| Fluorescent dye | .12 |
| Perfume | .15 |
| Benzotriazole | .02 |
| Water | 55.11 |

EXAMPLE F

Another light duty built liquid detergent consists of:

| | Percent |
|---|---|
| Sodium salt of sulfuric acid ester of the reaction product of one mole of coconut oil alcohol and 3 moles of ethylene oxide | 11.0 |
| Dodecyldimethylamine oxide | 6.0 |
| Sodium tallow alkyl sulfate | 2.25 |
| Pentapotassium salt of ethane - 1 - hydroxy-1,1,2-triphosphonic acid | 12.0 |
| Potassium toluene sulfonate | 5.5 |
| Water | 63.25 |

This composition is especially suited for dishwashing and fine fabric washing situations.

The following tests demonstrate outstanding and unexpected superior performance results made possible by the present invention. Built detergent compositions which embody the novel builder compounds described herein provide a level of cleaning which is significantly superior to detergent compositions built with sodium tripolyphosphate and, in most all instances, superior to or comparable to cleaning levels obtained by ethylenediaminetetraacetic acid. Sodium tripolyphosphate, STP, of course, is a condensed polyphosphate compound that is widely used in commercially available detergent compositions. It is a fairly well recognized standard builder compound. Ethylenediaminetetraacetate, EDTA, is also a well known builder compound. Its value as a builder has been recognized previously, but it has not found general acceptance for such use because, among other reasons, it is too expensive to prepare.

Equally as important and surprising is the increased efficiency of the detergent compositions which employ ethanehydroxytriphosphonate compounds as builders. The increased efficiency is manifested by the fact that even when the compositions of the present invention are used in concentrations far below currently recommended usage levels, equal performance results are obtained. This can be more fully appreciated by a close examination of FIGURES I–IV.

Three different performance characteristics of built detergent compositions were evaluated: cleaning, whiteness, and whiteness maintenance. For purposes of this invention, these terms have the following meanings. The term "cleaning" identifies the ability of a built detergent composition to remove soil from soiled fabrics. In part, this applies to the removal of deeply embedded soil deposits such as occurs, for instance, at the collars and cuffs of shirts and blouses. Whiteness is a more general term which identifies or represents a measurement of the ability of a built detergent composition to whiten areas which are only slightly or moderately soiled. Whiteness maintenance is a term which is used to identify the ability of a detergent formulation to prevent the soil which has been removed during a normal washing cycle from being redeposited upon the fabrics during the remainder of the laundering process, e.g., washing and rinsing, etc.

More specifically, the surprising building ability of the ethane hydroxy triphosphonate compounds of the present invention was discovered by washing naturally soiled white dress shirts with detergent compositions built with different builder materials. Shirts with detachable collars and cuffs were worn by male subjects under ordinary conditions for a certain period of time. The collars and cuffs were then detached and washed in an ordinary agitator type washing machine using solutions of the built detergent compositions being evaluated.

The washed and dried collars and cuffs were graded by means of a visual comparison with other collars and cuffs which had been similarly worn and soiled but which were washed with a standard built detergent composition. The visual comparisons were made by a trained panel of five people who were unfamiliar with any specific details and objectives of the tests. Their judgments were made independently.

Their visual judgments were expressed on a scale ranging from zero to ten. This determination records only the relative cleaning performance grades among the several compositions being evaluated. Zero on the cleaning grade scale represents a cleaning level obtained by washing with water alone, i.e., no detergent formulation. A value of ten represents the cleaning level of a specially formulated standardized detergent composition under optimum conditions. For purposes of this evaluation, a value grade of five represents a level of cleaning that is considered satisfactory in household practice.

The test described above employed a detergent composition consisting only of an active detergent compound and a builder compound. For these tests, ethane-1-hydroxy-1,1,2-triphosphonic acid (pentasodium salt) and ethane-2-hydroxy-1,1,2-triphosphonic acid (pentasodium salt) were used as a representative builder compound coming within the scope of the present invention. Results obtained with these representative materials were compared with results obtained with STP and EDTA.

Each of the several builder compounds was tested with detergent compounds which are representative of the previously disclosed detergent classes.

In order to obtain as accurate a measurement as possible of the builder effect of the sample compounds, none of the usual additives, such as sulfates, silicates, fluorescers, anti-redeposition agents, etc., were used in these tests. By limiting the compositions to only two ingredients, i.e., an active detergent and a builder, there could be no interference or masking over of the function of the builders. The concentration of the active detergent in the washing solution was constant at .03% by weight. The concentrations of the builders in the washing solutions varied from .03%, .04%, .045%, and .06%. Each builder was not tested at each of these concentrations, and this is made apparent from the information plotted in FIGURES I to VI.

In addition, the washing solutions containing seven grains per gallon hardness (equivalent $CaCO_3$) were adjusted with NaOH to a pH of 10 or 11 as indicated below. The temperature of the washing solutions were 80° F. or 140° F., also as indicated below. The duration of the washing cycle was 10 minutes.

In all of the figures, a difference on the grading scale of 1 unit represents a significant difference. By this is meant that an average housewife could readily and consistently see a significant cleaning difference between any two fabrics which have scores separated by a magnitude of at least 1 unit.

In FIGURE I, the results were obtained with built detergent compositions containing sodium dodecyl benzene sulfonate, the dodecyl being derived from tetrapropylene. The temperature of the wash solution was 140° F.

From FIGURE I it will be seen that STP at a concentration of .06 gram/100 ml. water scored a grade of 5, which, as previously noted, is a generally acceptable grade for ordinary household usage. At concentrations less than .06, however, it should be noted that the cleaning performance falls off markedly until at concentration of .03 gram/100 ml. of water, STP scored just 1 unit. EDTA at a concentration of .06%, or .06 gram per 100 ml. water, scored 7.1, significantly better than STP. However, at a concentration of .045 gram/100 ml., EDTA scored only 5.1; and at a concentration of .03 gram per 100 ml., the grading score for EDTA dropped off all the way to .4 unit.

On the other hand, both of the builder compounds of the present invention not only scored above STP on the grading scale, but they also demonstrated remarkable efficiency in maintaining superior cleaning grades even with lower concentrations, e.g., .03 gram/100 ml. water and .04 gram/100 ml. water. Both ethane-1-hydroxy-1,1,2-triphosphonic acid (pentasodium) and ethane-2-hydroxy-1,1,2-triphosphonic (pentasodium) surprisingly demonstrated this unexpected degree of efficiency which, as can be seen from FIGURE I, resulted in cleaning grades of 5 and higher. The achievement of the ethane-1-hydroxy-1,1,2-triphosphonate compound is especially noteworthy. Its cleaning superiority over STP at the .06 gram usage level is of a totally unexpected magnitude. The fact that this superiority actually increases at lower usage levels is singularly significant. Thus, at .03% concentration of ethane-1-hydroxy-1,1,2-triphosphonate, the cleaning grade is almost two cleaning units higher than that level obtained with STP at .06% concentration. A comparison of the steep EDTA curve with the relatively flat triphosphonate curves should also be noted.

These same relatively flat curves could be extended out to a usage concentration of .015%. The practical value of the remarkable efficiency of the compounds of the present invention will be readily apparent in situations of insufficient product usage and to formulators of built detergent compositions and especially to those interested in built detergent compositions and especially to those interested in built liquid detergent compositions where special formulating problems are encountered, e.g., solubility, cost, etc.

In FIGURE II, the active detergent was sodium tallow alkyl sulfate. Other conditions were exactly similar to those discussed in terms of FIGURE I. There is a marked similarity between the curves of FIGURE I and those of FIGURE II. Here again, the ethanehydroxytriphosphonate curves are relatively flat over a wide range of concentration. In contrast, both STP and EDTA fall off rapidly in cleaning performance as usage concentration is decreased. Even with an excellent detergent such as tallow alkyl sulfate, the builder contribution of the triphosphonates is measurably significant. As in FIGURE I, it can be observed in FIGURE II that the cleaning grades of the triphosphonates at .03% for exceed STP and EDTA at equal concentrations. Ethane-1-hydroxy-1,1,2-triphosphonate at .03% outperforms STP at .06%, attesting to the increased builder efficiency of the compositions of the present invention.

Cleaning evaluations were also made in relatively cool water, e.g., 80° F., with nonionic and zwitterionic detergent compounds in order to demonstrate the marked flexibility that the novel builder compounds described offer to the detergent formulator. Although the number of tests were slightly less than described in FIGURES I and II, they are still adequate to demonstrate consistently the high cleaning levels and greater efficiency of the triphosphonate builder compounds.

In FIGURE III, the detergent used was 3-(N,N-dimethyl-N-hexadecyl ammonio) propane-1-sulfonate. The pH was 11; temperature 80° F.; detergent concentration .03%. The cleaning grade of ethane-1-hydroxy-1,1,2-triphosphonate at .03% was almost two complete scoring units greater than STP at equal concentration, and significantly better than either STP or EDTA at .06%.

FIGURE IV shows the remarkable cleaning results obtained with a representative nonionic detergent, dimethyl dodecyl phosphine oxide. The wash solution temperature was 80° F. and pH was 11. The superior cleaning performance of the ethane-1-hydroxy-1,1,2-triphosphonate builder is readily apparent. Equally good results are obtainable with the other nonionic detergents disclosed above.

In another test that was conducted, ethane-1-hydroxy-1,1,2-triphosphonate was compared at .03% with STP 1,1,2-triphosphonate at .06% using sodium tetradecyl sulfate in a wash solution having a temperature of 80° F., a pH of 11, and 7 grams hardness. The result was that the cleaning grade obtained with the triphosphonate builder (7.2) was almost a full grading unit higher than the STP cleaning grade (6.3).

Comparative cleaning results were also obtained with another zwitterionic detergent, 3-(N-coconut-N,N-dimethyl ammonio)-2-hydroxy propane-1-sulfonate, using equal weight concentrations of .06% in a wash solution of pH 11, at 80° F., hardness 7 grains. The result was that ethane-1-hydroxy-1,1,2-triphosphonate performed on a parity with EDTA and STP. While there was no clear advantage in this test for the triphosphonates, it can reasonably be expected that since the cleaning results are equal at .06%, the projected triphosphonate curve at lower concentrations would follow the usual pattern of FIGURES I through IV.

The collar and cuff samples washed in accordance with the preceding discussion, using the representative detergent and builder compounds, and for which cleaning results are presented in FIGURES I, II, III, and IV, were thereafter examined for "whiteness" performance results.

The whiteness measurements were made on the backs of the cuffs with a commercially available photoelectric reflectometer, i.e., a Hunter Color and Color Difference Meter manufactured by Henry A. Gardner Laboratory, Inc. This instrument is designed to distinguish color differences and operates on the tristimulus colorimeter principle. According to this principle, a 45 degree diffuse reflectance of an incident light beam on a test specimen is measured through a combination of green, blue and amber filters. The electrical circuitry of the instrument is so designed that lightness and chromaticity values for the test specimen are read directly. The departure from white ($TiO_2$ being taken as a standard white) of the test specimen is calculated by introducing the lightness and chromaticity values so obtained into a complex formula supplied by the manufacturer. An evaluation of relative whiteness performance compared to a standard detergent composition is thus obtained for the test formulation and interpolated into a 1–10 scale. A more comprehensive description of this device and its mode of operation appears in Color In Business, Science and Industry by Deane B. Judd, pages 260–262 published by John Wiley & Sons, New York (1952).

The clear performance and efficiency advantages for the triphosphonate compounds discussed above in connection with cleaning were also apparent in these "whiteness" measurements. This was especially true with the ethane-1-hydroxy-1,1,2-triphosphonate compound. Both the 1-hydroxy and the 2-hydroxy compounds offered excellent whiteness results, e.g., always on a parity with STP or significantly superior thereto.

In no instance did either STP or EDTA show a clear advantage over the triphosphonate builders described herein. Whiteness measurements taken of samples washed in .03% builder concentrations showed a clear efficiency advantage for the triphosphonate builders.

The evaluation of "whiteness maintenance" capability of the respective builders was performed by the following method. Unsoiled swatches of cotton terry cloth were washed with the wash solutions obtained from the cleaning tests. In other words, the unsoiled swatches are added to the "dirty" wash water from the "cleaning" tests. The swatches are dried and then the whiteness thereof is measured by a Hunter Color and Color-Difference Meter following the same procedure described above. The soil adhering to the swatches is a relative measure of soil which has been adsorbed from the washing solutions containing the aforementioned representative builders. Factors are involved here other than the anti-redeposition characteristic of the built detergent composition. It is, however, one way of demonstrating this property; and for showing relative performance, the test is valuable.

By virtue of these tests, it was ascertained that the ethanehydroxytriphosphonate builder compounds of the present invention have very valuable whiteness maintenance properties. In all instances, the ethane-1-hydroxy-1,1,2-triphosphonate and the ethane-2-hydroxy-1,1,2-triphosphonate builders either offered superior whiteness maintenance results over STP and EDTA or at least on a parity therewith. It should be appreciated that those instances where the whiteness maintenance results were comparable are actually examples of the increased efficiency of the triphosphonate builder compounds. This is true because the amount of soil which is available to be redeposited in fabrics is proportionately greater in those cases where more soil was removed during the washing cycle. The cleaning results tabulated in FIGURES I, II, III, and IV show the improved cleaning results over STP or EDTA and establish that there is that much more soil to keep from redepositing. The whiteness measurement results mentioned above, therefore, show that the triphosphonates are outperforming STP and EDTA as improved whiteness maintenance builders.

In many industrial, institutional and household processes and products, a small amount of a metal ion contamination present in water may adversely affect color, stability, appearance, quality and saleability of a product or the efficiency of a process. The role of a sequestrant or complexing agent in helping to overcome such adverse effects of metal ions is fairly well recognized and appreciated.

It is another embodiment of the present invention to provide a highly improved process for treating aqueous solutions containing polyvalent metal ions by adding to the solution an effective amount of an ethane hydroxy triphosphonate compound. Ordinarily this amount ranges from .25 p.p.m. to 10,000 p.p.m. of the aqueous solution. This aspect of the present invention is based on the discovery of the outstanding sequestering properties of the novel triphosphonate compounds described herein.

It has been recognized generally that sequestering agents, such as amino acid sequestrants including nitrilotriacetic acid and EDTA, react with polyvalent metal ions on a mole-to-mole basis. The relative efficiency of sequestrants is related to their molecular weight. By this criteria alone it will be observed from the following table that the ethane hydroxy triphosphonate compounds of the present invention are, in the order of magnitude, about three times as efficient as sodium tripolyphosphate.

As a result of this discovery, it is possible to employ only about ⅓ of a mole of an ethane hydroxy triphosphonate compound to sequester or complex as much of a metal ion in aqueous solution as it takes a whole mole of sodium tripolyphosphate to do. In other words, the triphosphonates provide an efficiency improvement on the order of 300.

Table I

| Sequestrant: | Calcium sequestering ability (g. calcium/ 100 g. sequestrant) |
| --- | --- |
| Sodium tripolyphosphate (STP) | 7.9 |
| Ethylenediaminetetraacetate ($Na_4$ salt) | 10.6 |
| Nitrilotriacetate ($Na_3$ salt) | 14.6 |
| Pentasodiumethane-2-hydroxy 1,1,2-triphosphonate ($Na_5H$ salt) | 21.8 |
| Pentasodiumethane-1-hydroxy-1,1,2-triphosphonate ($Na_5H$ salt) | 24.1 |

The data in Table I was obtained by using a modification in which caprate is substituted for oxalate in the nephelometric oxalate test described in The Journal of Physical Chemistry, volume 64, 1398 (1960), written by R. R. Irani and C. F. Callis. Tests were conducted at 25° C. and at pH 11.

In addition to the remarkable efficiency of the ethane hydroxy triphosphonate compounds evidenced in Table I, there is another noteworthy feature that distinguishes the present invention from previously known sequestrant compounds. It has been discovered that a complex formed between a metal ion such as calcium and a triphosphonate sequestrant is on a molar ratio of calcium to triphosphonate approaching 2:1. Thus, each mole of ethane-1-hydroxy-1,1,2-triphosphonate, for instance, complexes at least two moles of calcium per mole of triphosphonate. This compares to such sequestrants as STP and EDTA, which tend to form complexes on a 1:1 molar ratio. So far as is known, this is the first class of sequestrants ever discovered which provide this outstanding type of complex formation.

Another property which distinguishes a superior sequestrant from more ordinary ones is the strength of the metal ion complex which is formed. On this basis also, the ethanehydroxytriphosphonate sequestrants of this invention offer advantages over known sequestrants.

Ethane-1-hydroxy-1,1,2-triphosphonate or ethane-2-hydroxy-1,1,2-triphosphonate molecule has much more effect on the calcium sequestering efficiency than could be expected based on the negligible calcium sequestering efficiency observed for compounds whose acids have the formulas $$H_2O_3PCH_2COOH, H_2OPCH_2OH \text{ and}$$
$$H_2O_3PCH_2CH_2PO_3H_2.$$

The comparison in Table II below is of interest.

TABLE II

| Acid Formula | Calcium Sequestering Efficiency | Effect/ Phosphonate Moiety |
|---|---|---|
| Ethane-1-hydroxy-1,1-diphosphonic acid CH₃C(OH)(PO₃H₂). | 1.56 Ca/mole | 0.78 Ca/(PO₃H₂) |
| Ethane-2-hydroxy-1,1,2-triphosphonic acid H₂O₃PCH(OH)CH(PO₃H₂)₂. | 2.13 Ca/mole | 0.71 Ca/(PO₃H₂) |
| Ethane-1-hydroxy-1,1,2-triphosphonic acid H₂O₃PCH₂C(OH)(PO₃H₂)₂. | 2.39 Ca/mole | 0.79 Ca/(PO₃H₂) |

Based on the outstanding sequestering properties of the ethanehydroxytriphosphonate compounds, the present invention provides an improved process of treating aqueous solutions by adding to the solution an effective amount of a triphosphonate compound. Specific applications of such a process include the softening of water since the triphosphonates bind the metail ions which are part of the water hardness producing materials, e.g., calcium and magnesium ions. In such a process, as will be appreciated from the preceding discussion, it is not necessary to work with stoichiometric quantities; use of less than stoichiometric amounts effectively retards or inhibits calcite formation.

Further applications are also apparent from the foregoing description of the invention. Among these are descaling of textiles in which alkaline earth metal salts have been deposited; the lessening of the ash content in fabrics which have been treated with soap or pyrophosphate containing washing agents; in cleaning processes such as in the washing of bottles in which precipitation of calcite is avoided by adding to the washing solution effective amounts of a triphosphonate sequestrant.

The ethane hydroxytriphosphonates are also suitable as additives to dyebaths for textiles, in which they form complexes with metal ions which would otherwise produce undesired shades of color. Yet further applications include agricultural uses such as making up concentrates of herbicides and plant treating compositions; photographic uses in which hard water elements are responsible for sludges and turbidity in developing and fixing solutions; industrial cleaning situations in which scales and sludges are formed, such as hard water scale, milk stone, beer stone, metal soaps, floor cleaning compounds, boiler and evaporator scales, and sugar evaporator scales. In textile finishing and dyeing, the sequestrants of the present invention can be used in conjunction with bleaching and brightening steps, and desizing and dyeing baths.

The ethane hydroxytriphosphonate compounds of the present invention are also useful as additives to synthetic rubber; in tanning processes; rare earth separations; as well as in pharmaceuticals. Still other valuable uses of sequestrants are found in the literature including a text entitled "Organic Sequestering Agents" written by S. Chaberek and A. Martell, published in 1959 by John Wiley & Sons, Inc., New York, N.Y.

The foregoing discussion has pointed out that the ethane hydroxytriphosphonates are useful as builders and also that they are useful as sequestrants. It should be noted that the builder activity of these compounds is not directly related to the sequestering ability of these materials. The building action is clearly demonstrable even if distilled water is used exclusively in detergency tests. Moreover, there is no predictable correlation between relative performances of sequestrants and detergent builders. Some highly efficient sequestrants are outperformed as builders by less effective sequestrants.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:

1. A detergent composition consisting essentially of (A) a water soluble organic detergent and (B) ethanehydroxytriphosphonic acid or a salt thereof having the structural formula:

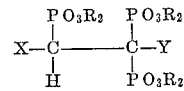

wherein X and Y are each H or OH so that when X is H, Y is OH; and when Y is H, X is OH; and wherein each R is H, alkali metal, or lower alkyl radicals having from 1 to about 6 carbon atoms thereof, the proportion of (A) and (B) being in the range of from about 2:1 to about 1:10, by weight.

2. A detergent composition as described in claim 1 in which the proportion of (A) and (B) is in the range of from about 1:1 to about 1:6 by weight.

3. A detergent composition consisting essentially of (A) a water soluble anionic organic detergent and (B) an alkali metal salt of ethane-1-hydroxy-1,1,2-triphosphonic acid, the proportion of (A) and (B) being in the range of from about 2:1 to about 1:10, by weight, said composition having a pH in the range of from about 8 to about 12.

4. A detergent composition consisting essentially of (A) a water soluble anionic organic detergent and (B) an alkali metal salt of ethane-2-hydroxy-1,1,2-triphosphonic acid, the proportion of (A) and (B) being in the range of from about 2:1 to about 1:10, by weight, said composion having a pH in the range of from about 8 to about 12.

References Cited

UNITED STATES PATENTS 3,159,581  12/1964  Diehl _____ 252—152
3,214,454  10/1965  Blaser et al. _____ 260—429.9

MAYER WEINBLATT, *Primary Examiner.*

U.S. Cl. X.R.

252—117, 137; 260—502.4